United States Patent [19]
Suzuki

[11] Patent Number: 5,569,009
[45] Date of Patent: Oct. 29, 1996

[54] LOOSENING PREVENTION SCREW

[75] Inventor: Yasuo Suzuki, Saitama, Japan

[73] Assignee: Kabushiki Kaisha Suzuki Rashi Seisakusho, Saitama, Japan

[21] Appl. No.: 156,044

[22] Filed: Nov. 23, 1993

[30]   Foreign Application Priority Data

Nov. 26, 1992   [JP]   Japan .................... 4-316981

[51] Int. Cl.$^6$ .................................... F16B 35/04
[52] U.S. Cl. .................................... 411/413; 411/307
[58] Field of Search .................... 411/411–415, 307–310, 411/168

[56]         References Cited

U.S. PATENT DOCUMENTS

| | | | |
|---|---|---|---|
| 635,297 | 10/1899 | Caldwell | 411/411 |
| 1,230,603 | 6/1917 | Richmond | 411/413 |
| 1,827,615 | 10/1931 | Rosenberg | 411/411 |
| 3,207,023 | 9/1965 | Knohl | 411/412 |
| 3,682,507 | 8/1972 | Waud | 411/413 |
| 5,294,227 | 3/1994 | Foster | 411/412 |

FOREIGN PATENT DOCUMENTS

| | | | |
|---|---|---|---|
| 44366 | 7/1977 | Japan | 411/413 |
| 4-175508 | 6/1992 | Japan . | |
| 2070996 | 9/1981 | United Kingdom | 411/413 |
| 8505415 | 12/1985 | WIPO | 411/413 |

*Primary Examiner*—Flemming Saether
*Attorney, Agent, or Firm*—Lowe, Price, LeBlanc & Becker

[57]             ABSTRACT

The screw of this invention can be used for fastening members of a variety of materials and reliably prevent loosening of the screw. The screw shank is formed with two threads, a main thread for driving the screw and a sub-thread which extends in the same direction as the main thread, is smaller in outer diameter than the main thread and has a pitch different from the main thread. The inclination of the slant surface of the sub-thread is set steep on the loosening side and moderate on the fastening side. The pitch of the main thread is set larger than that of the sub-thread. When the tightened screw is applied a loosening torque, the sub-thread bites into the inner wall of the hole, preventing the screw from being loosened.

3 Claims, 3 Drawing Sheets

LOOSENING PREVENTION SCREW

BACKGROUND OF THE INVENTION

1. Field of the Invention

The present invention relates to a fastening screw and a tapping screw and more particularly to a loosening prevention screw which can prevent the screw after being tightened from becoming loose and which has a reverse rotation prevention function or a locking function.

2. Description of the Prior Art

Screws are used to connect two or more members together easily. Tapping screws, in particular, have found a wide range of applications in electric appliances and automobile parts because of their advantage of not requiring female threads to be formed except for drilled holes in steel plates or resin materials.

Such screws, however, generally have a small return torque and are easily rotated in a reverse direction when subjected to vibrations after being tightened. To cope with this problem, a spring washer or a double nut is used for the bolt and nut fastenings. In the case of tapping screws, the countermeasures include a reverse rotation prevention washer and a glue.

The above-mentioned countermeasures, however, require additional parts other than the screw, such as spring washer, another nut, washer and bonding agents, raising the cost and increasing the number of work processes for fastening. In the case of the tapping screw, loosening is also caused by plastic deformation of a female screw member, not accompanied by rotation of the screw. Such a loosening cannot be prevented reliably with the above measures.

SUMMARY OF THE INVENTION

To solve these problems, the applicant of this invention proposed a screw shown in FIG. 4 in Japanese Patent Application No. Heisei 2-246203. The screw shown in the figure has a main thread 2, which is an ordinary thread, formed on the shank 1 and also a sub-thread 3 formed in the opposite direction.

As the tapping screw is driven into a pre-drilled hole 4, the main thread 2 advances into the pre-drilled hole 4 tapping a female thread in the hole in the same way as the ordinary tapping screws do. The sub-thread 3 has its outer diameter set slightly larger than the diameter of the pre-drilled hole 4 and is inclined at a moderate angle on the screw-in side, so that it works like a wedge and, as the main thread 2 is driven, advances into the pre-drilled hole 4 in a direction reverse to the direction in which the sub-thread is being turned, thus forming a resistance groove 4b, shallower than the female thread 4a, in the pre-drilled hole 4.

When the fastened tapping screw is subjected to a loosening torque due to vibration, the loosening torque for the main thread 2 is a tightening torque for the sub-thread 3, so that the sub-thread resists rotation in the loosening direction, thereby preventing the tapping screw from getting loose.

The above tapping screw is suited for soft materials such as plastics with a relatively small screw-in resistance. For hard materials or thin steel plates, however, the fastening torque increases making the tightening difficult. For brittle materials, there is a possibility of breaking the female threads. For these reasons, the range of use of the tapping screws is limited.

The present invention has been accomplished to solve the above-mentioned problems and its objective is to provide a screw, which can be used in a variety of materials including various kinds of plastics and thin steel plates, does not increase the screw-in torque significantly, and can prevent loosening reliably.

To achieve the above objective, the present invention is characterized in that the screw shank is formed with two threads, a main thread for driving the screw and a sub-thread which extends in the same direction as the main thread, is smaller in outer diameter than the main thread and has a pitch different from the main thread.

It is preferred that the inclination of the slant surface of the sub-thread be set sharp on the loosening side and moderate on the screw-in side and that the pitch of the main thread be set larger than that of the sub-thread.

As the screw is fastened, the screw is driven by the main thread whose outer diameter is large. The sub-thread, which is smaller in outer diameter than the main thread and has a different pitch from that of the main thread, is forced into the drilled hole by the driving force of the main thread. Because the sub-thread is formed in the same direction as the main thread, the fastening torque is only slightly increased, facilitating the driving of the screw. When, after the screw is fastened, a loosening torque is applied along the spiral direction of the main thread, the sub-thread with a different pitch from that of the main thread bites into the circumferential wall of the female-threaded hole, resisting the loosening torque and preventing the screw from being loosened.

If the inclination of the slant surface of the sub-thread is moderate on the fastening side and sharp on the loosening side, the fastening torque is reduced. When the screw is subjected to the loosening torque, the steep slope of the sub-thread bites into the circumferential wall of the female-threaded hole with greater force, producing a strong resisting force. If the pitch of the sub-thread is smaller than that of the main pitch, the resisting force against loosening also increases.

DETAILED DESCRIPTION OF PREFERRED EMBODIMENT

One embodiment of this invention will be described in detail by referring to FIG. 1.

Figures 1A, 1B:
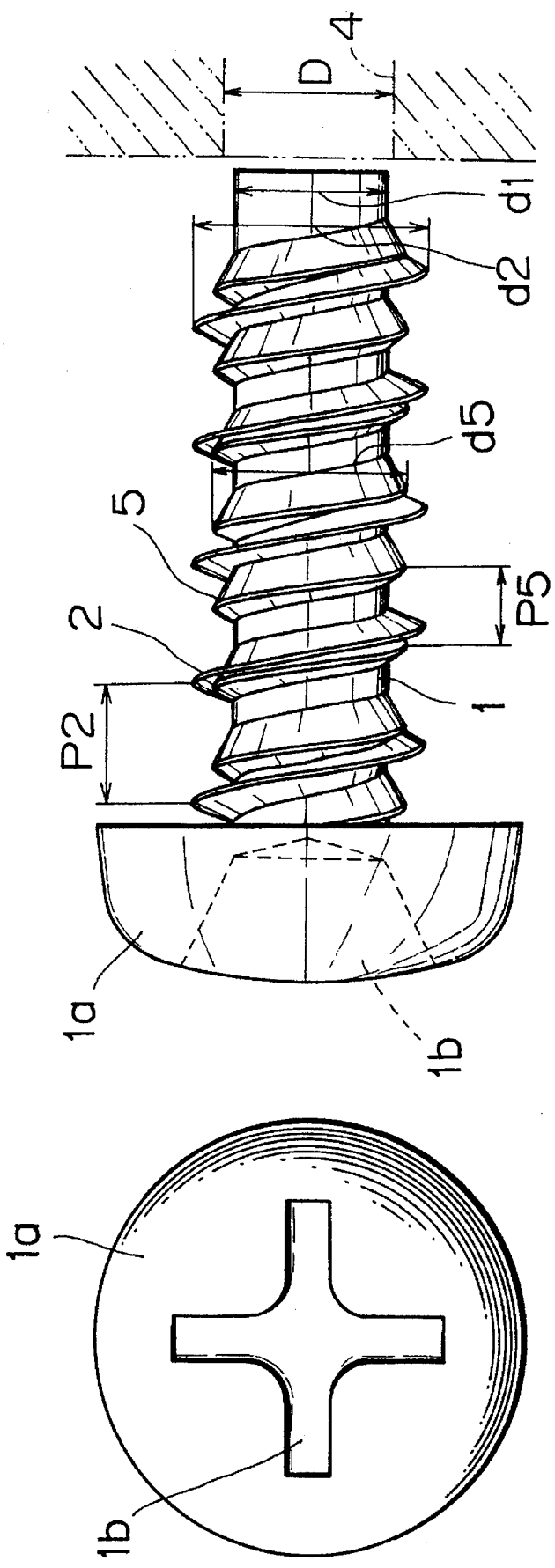
FIG. 1a is a plan view of a screw of this invention and FIG. 1b a front view of the same.

FIG. 1 shows a tapping screw according to one embodiment of the present invention. As shown in the figure, the tapping screw of this invention includes a shank 1 which is formed with two kinds of threads, a main thread 2 similar to ordinary ones for driving the screw and a sub-thread 5 running in the same direction as the main thread 2 and having a smaller pitch than that of the main thread.

The main thread 2 is larger in outer diameter than the sub-thread 5, whose outer diameter is slightly larger than the diameter of a pre-drilled hole 4. If the diameter of the shank 1 is taken as $d_1$, the diameter of the main thread 2 as $d_2$, the diameter of the sub-thread 5 as $d_5$, and the diameter of the pre-drilled hole 4 as D, the following relation holds: $d_1 < D < d_5 < d_2$.

The pitch $p_2$ of the main thread 2 needs to be different from the pitch $p_5$ of the sub-thread 5. Setting the pitches as $p_2 > p_5$ increases the loosening prevention effect. In the embodiment shown, there is the following relationship: $p_2 : p_5 = 3 : 2$.

Figure 2:
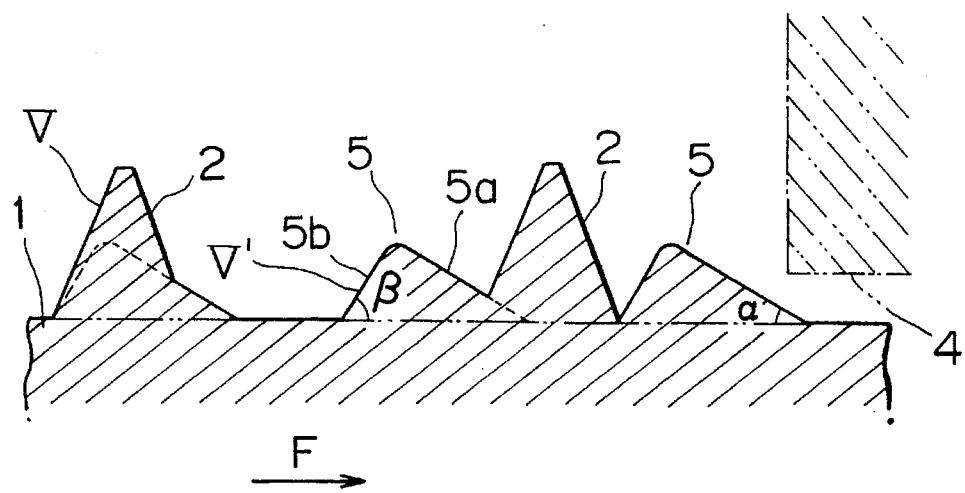
FIG. 2 is a fragmentary cross section showing an essential portion of the screw shown in FIG. 1.

FIG. 2 is a fragmentary cross section showing an essential portion of the screw of this invention. As shown in the figure, the cross section of the main thread 2 is an isosceles triangle while the cross section of the sub-thread 5 is a scalene triangle. Arrow F represents the direction in which the screw is fastened. In the sub-thread 5, the inclination $\alpha$ of the slant surface 5a on the fastening side is smaller (or more moderate) than the inclination $\alpha$ of the slant surface 5b on the loosening side. If the screw of this invention is to be formed by rolling, the rolling is facilitated by setting the volume V of the main thread 2 and the volume V' of the sub-thread 5 equal.

Figure 3:
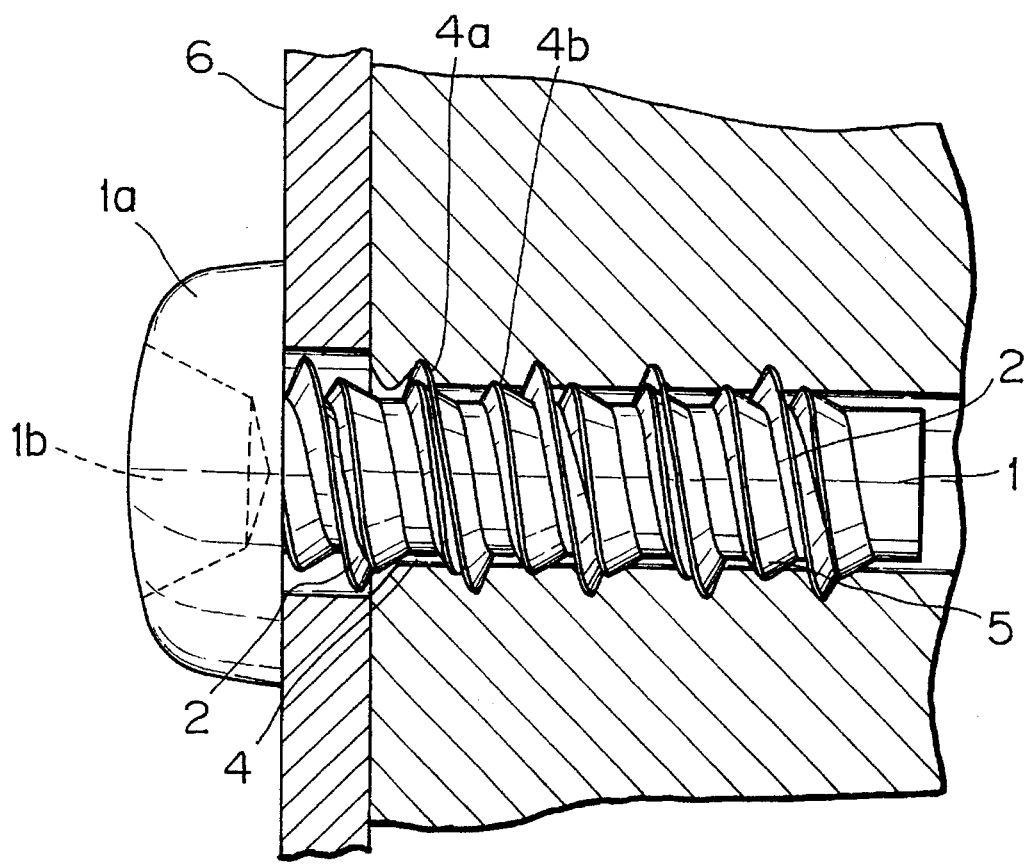
FIG. 3 is a cross section showing the screw of this invention screwed into the pre-drilled hole.
Figure 4:
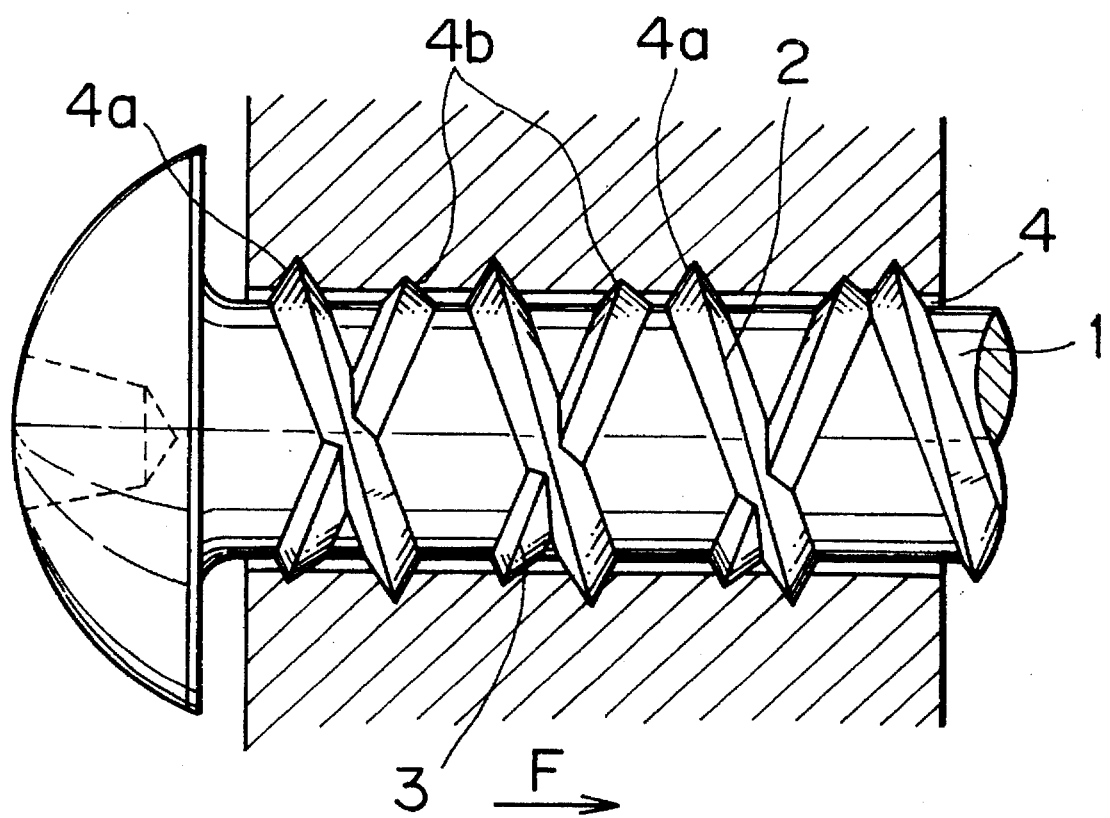
FIG. 4 is a cross section of a screw of the previous patent application, which corresponds to FIG. 3.

The tapping screw of the above-mentioned construction is driven into the pre-drilled hole 4 as follows. In FIG. 3, a screwdriver tip is inserted into a groove 1b in the head 1a of the screw and turned to drive the screw into the hole in the same way as in the ordinary tapping screw having only the main screw 2. The main thread 2 is driven into the hole forming a female thread 4a in the hole 4 and fastening the member 6 to be tightened to the member 4' drilled with the hole 4.

Because the sub-thread 5 is smaller in outer diameter than the main thread 2 and slightly larger than the diameter of the pre-drilled hole 4, the sub-thread 5 is forced into the hole 4, while nearly sliding, at a pitch different from its own screw-in pitch, forming a resistance groove 4b shallower than the female thread 4a. Since the sub-thread 5 is in the same direction as the main thread 2 and the inclination of the slant surface 5a on the screw-in side is smaller than that on the other side, the sub-thread 5 acts like a wedge, so that the fastening torque required to drive the main thread 2 need only be about as large as the fastening torque of the ordinary tapping screws. This means that the screw-in torque is not increased substantially and thus the tapping screw of this invention can be used in a wide range of applications.

If the member in which the hole is drilled has tenacity, the main thread as it is driven into the hole produces plastic deformation in the member, causing the member to be deformed inwardly of the hole 4, reducing the inner diameter of the hole. Therefore, if the diameter of the hole is equal to the outer diameter of the sub-thread 5 or if the outer diameter of the sub-thread 5 is slightly smaller, the sub-thread 5 can bite into the hole, forming the resistance groove 4b to effectively prevent loosening of the screw.

Suppose that the tapping screw that is completely tightened is subjected to vibrations and is loosened by a loosening torque or by plastic deformation of the female thread, not accompanied by the rotation of the screw. Because the pitch $p_5$ of the sub-thread 5 differs from the pitch $p_2$ of the main screw 2, the friction between the slant surface 5b of the sub-thread 5 and the resistance groove 4b increases, causing the sub-thread 5 to bite into the hole 4. As a result, a strong resisting force against the loosening torque is produced.

Moreover, since the inclination 5b is steep, the resistance is further increased.

When equipment is to be overhauled for repair, screws must be loosened. For this purpose, a screwdriver may be used to apply a torque larger than the resistive force to the screw to be loosened. The same tapping screw may be used repetitively for the same hole 4. The loosening torque can be set almost equal to the fastening torque by selecting an appropriate shape and pitch of the sub-thread 5 with respect to the female-threaded material.

Ordinary tapping screws have a problem that the female thread 4a formed in the hole 4 is apt to be broken, loosening the screw. In this respect, since the slant surface 5a of the sub-thread 5, which is forced into the hole as the screw is tightened, presses against the groove of the female thread 4a to narrow it, the breakdown strength of the female thread 4a increases, reducing the possibility of the screw becoming loose. This in turn increases the number of times that the tapping screw can be used repetitively. If the vertex of the sub-thread 5 is rounded as shown in FIG. 2, it is possible to minimize the damage the sub-thread may cause to the hole 4 and further increase the number of times that the tapping screw can be used.

While the slant surface of the sub-thread in this embodiment is formed as a flat plane, which can effectively work as a wedge or for preventing the loosening of the screw, it can also be formed as a curved surface as long as it can perform the similar function. The screw of this invention is not limited to the tapping screw but can be applied to fastening screws in general.

As described above, the screw of this invention offers the following advantages. It can be used with pre-drilled holes that are formed not only in soft materials such as plastics but in a variety of materials including steel plates. This screw does not increase the fastening torque significantly. The screw, after being tightened, exhibits strong resistance against the loosening torque, thus reliably preventing the screw from becoming loose.

What is claimed is:

1. A loosening prevention screw comprising:

a main thread for driving the screw into a hole; and a sub-thread running in the same direction as the main thread, being smaller in outer diameter than the main thread, and having a pitch different from that of the main thread;

wherein the main thread and the sub-thread are formed over substantially a same longitudinal distance on a same shank of the screw, and;

wherein the pitch of the main thread is coarser that the pitch of the sub-thread.

2. A loosening prevention screw according to claim 1, wherein the inclination of a slant surface of the sub-thread is set steep on the loosening side and moderate on the fastening side.

3. A loosening prevention screw according to claim 1, wherein the main thread is an isosceles triangle in cross section while the sub-thread is a scalene triangle in cross section.

* * * * *